United States Patent [19]

Mori et al.

[11] Patent Number: 5,104,748

[45] Date of Patent: Apr. 14, 1992

[54] WEAR RESISTING COPPER BASE ALLOY

[75] Inventors: Kazuhiko Mori; Soya Takagi; Minoru Kawasaki, all of Toyota; Shinji Kato, Aichi, all of Japan

[73] Assignee: Toyota Jidosha Kabushiki Kaisha, Toyota, Japan

[21] Appl. No.: 492,359

[22] Filed: Mar. 9, 1990

Related U.S. Application Data

[63] Continuation of Ser. No. 411,257, Sep. 25, 1989, abandoned, which is a continuation of Ser. No. 282,360, Dec. 9, 1988, abandoned.

[30] Foreign Application Priority Data

Dec. 10, 1987 [JP] Japan .................. 62-312619

[51] Int. Cl.$^5$ .......................... C22C 9/06; C22C 9/00; B32B 5/16
[52] U.S. Cl. ................... 428/674; 148/414; 148/419
[58] Field of Search ............. 428/674; 148/414, 419

[56] References Cited

U.S. PATENT DOCUMENTS

| 3,072,508 | 1/1963 | Klement et al. | 148/414 |
| 3,340,049 | 9/1967 | Quaas et al. | 428/450 |
| 3,372,010 | 3/1968 | Parsons | 51/307 |
| 4,260,435 | 4/1981 | Edens et al. | 148/414 |
| 4,818,307 | 4/1989 | Mori et al. | 148/414 |

OTHER PUBLICATIONS

"Metallurgy Series 1–Constructing Metal Materials and Their Heat Treatment", Jul. 20, 1977, Japan Metallurgy Association, pp. 20–25.

Primary Examiner—R. Dean
Assistant Examiner—David Schumaker
Attorney, Agent, or Firm—Finnegan, Henderson, Farabow, Garrett & Dunner

[57] ABSTRACT

A copper base alloy exhibits improved wear resistance particularly at elevated temperatures, which consists essentially of, in percent by weight, 10–40% of Ni, 1–7% of Si, 0.5–5% of B, 1–20% of Cr, and the balance of Cu, wherein particles of at least one of chromium boride and chromium silicide having a size of about 0.1 to about 50 μm are evenly dispersed in a copper-nickel base matrix. The alloy may further contain W, Mo or Fe and/or a high-melting carbide such as WC and TaC.

4 Claims, 3 Drawing Sheets (EXAMPLE 1) (×200)

(EXAMPLE 2) (×200)

(EXAMPLE 3) (×200)

(EXAMPLE 4) (×200)

WEAR RESISTING COPPER BASE ALLOY

This application is a continuation of abandoned prior application Ser. No. 07/411,257 filed Sep. 25, 1989, which is a continuation of prior abandoned application Ser. No. 07/282,360, filed Dec. 9, 1988.

BACKGROUND OF THE INVENTION

This invention relates to copper base alloys having excellent wear resistance, and more particularly, to dispersion hardened copper base alloys suitable for forming a wear resisting layer on a selected portion of a metallic substrate.

Several wear resisting copper base materials are known in the art, for example, from "Metallurgy Series 1—Constructing Materials and Their Heat Treatment—," Jul. 20, 1977, Japan Metallurgy Association, pages 20–25, including precipitation-hardened alloys such as Cu-Ni-Si alloys known as Corson alloy and Be-Cu alloys typically containing about 2% by weight of beryllium as well as dispersion hardened alloys having particles dispersed in a copper base matrix, the dispersion phase particles being composed mainly of hard oxides such as $SiO_2$, $Cr_2O_3$, BeO, $TiO_2$, $ZrO_2$, MgO, and MnO. The former copper alloys of the precipitation hardening type are hardened by carrying out a solution heat treatment and then aging for an extended period of time, thereby precipitating intermediate phases or intermetallic compounds in the matrix. The latter copper alloys of the dispersion strengthening type are generally prepared by a sintering process comprising mixing copper or copper alloy powder forming a matrix with oxide powder forming a dispersion phase, and compressing the mixture followed by sintering. Also useful is an internal oxidation process comprising adding a metal more oxidizable than copper or copper alloy to copper or copper alloy forming a matrix, and holding the composition at elevated temperatures in an oxidizing atmosphere to thereby diffuse oxidizing gas into the matrix to form an oxide phase therein.

The precipitation-hardened alloys require an extended period of heat treatment at elevated temperatures because aging precipitation is accomplished by allowing diffusion to take place in a solid phase for a long period of time. The extended period of heat treatment at elevated temperatures is not adaptable to large-sized parts and often causes strain and other problems. Since particles precipitating in the alloys are as fine as several microns, the alloys are hard enough, but are insufficient in wear resisting performance, particularly in resistance to sliding wear. Better sliding wear resistance is obtained when hard particles having as large a diameter as about 10 to 100 microns are dispersed. It is difficult to precipitate such large diameter particles in the precipitation-hardened alloys.

The dispersion-strengthened alloys also have problems. As to the alloys strengthened by the internal oxidation process, the solid phase diffusion to produce dispersion phase particles requires a long period of treatment at elevated temperatures, which is not adaptable to large-sized parts and causes strain and other problems as in the case of precipitation hardening. The dispersion-strengthened alloys by the sintering process have the advantage that dispersion phase particles may be grown to any desired diameter. However, it is difficult to form a layer of dispersion-strengthened alloy on a selected portion of a substrate because the entire material has to be compressed and sintered.

We proposed in Japanese Patent Application No. 61-303176 (U.S. Ser. No. 133,620 filed Dec. 16, 1987) a wear resisting, dispersion-strengthened copper base alloy having excellent wear resistance, especially sliding wear resistance which can be formed simply and easily on a selected portion of a metallic substrate by fusion welding or cladding, irrespective of whether the substrate is large or small in size. The dispersion-strengthened copper base alloy having excellent wear resistance is claimed in said application as essentially consisting of, in weight percent, 5 to 30% of nickel, 1 to 5% of silicon, 0.5 to 3% of boron and 4 to 30% of iron, the remainder being copper and unavoidable impurities, and having a structure in which hard particles composed chiefly of a silicide of an iron-nickel system are dispersed in a copper base matrix. Also claimed is a dispersion-strengthened copper base alloy of the above-mentioned composition further containing one or more of 0.1 to 5% of aluminum, 0.1 to 5% of titanium, and 1 to 10% of manganese. Also claimed is a dispersion-strengthened copper base alloy of the above-mentioned composition further containing 0.02 to 2% of carbon, and one or more of 0.05 to 10% of chromium and 0.3 to 5% of titanium wherein carbide particles are dispersed in the copper base matrix along with the iron-nickel system silicide.

The dispersion-strengthened copper base alloy of said application may be readily formed on a metallic substrate by fusion welding or cladding using a high density heat energy as given by a laser beam, TIG arc, plasma arc, and electron beam. The resulting alloy has a structure in which hard grains of a silicide of an iron-nickel system having a hardness of about 700 to about 1200 Hv and optionally carbide grains are substantially uniformly dispersed in a copper base matrix having a hardness of about 150 to about 250 Hv.

The dispersion-strengthened copper base alloy of said application is suitable to form an alloy layer on a selected portion of a metallic substrate and exhibits outstandingly superior wear resistance at approximately room temperature to conventional alloys. Through the follow-up experimentation, we have found that the wear resistance of this alloy is not yet fully satisfactory at elevated temperatures.

SUMMARY OF THE INVENTION

An object of the present invention is to provide a wear resisting, dispersion-strengthened copper base alloy which can be readily formed on a selected portion of a metallic substrate by fusion welding or cladding and which exhibits improved wear resistance not only at room temperature, but also at elevated temperatures.

According to a first aspect of the present invention, there is provided a copper base alloy consisting essentially of, in percent by weight, 10 to 40% of nickel (Ni), 1 to 7% of silicon (Si), 0.5 to 5% of boron (B), 1 to 20% of chromium (Cr), and the balance of copper (Cu), wherein particles of chromium boride and/or chromium silicide having a size of about 0.1 to about 50 μm are evenly dispersed in a copper-nickel base matrix.

According to a second aspect of the present invention, there is provided a copper base alloy of the above-defined composition which further contains at least one member selected from the group consisting of 0.1 to 5% of tungsten (W), 0.1 to 5% of molybdenum (Mo), and 1 to 20% of iron (Fe).

According to a third aspect of the present invention, there is provided a copper base alloy of the above-defined composition which further contains 1 to 20% of a high melting carbide, wherein particles of the high melting carbide are evenly dispersed in the copper-nickel base matrix along with the chromium boride and/or chromium silicide particles.

According to a fourth aspect of the present invention, there is provided a copper base alloy of the above-defined composition which further contains at least one member selected from the group consisting of 0.1 to 5% of tungsten (W), 0.1 to 5% of molybdenum (Mo), and 1 to 20% of iron (Fe), and 1 to 20% of a high melting carbide, wherein particles of the high melting carbide are evenly dispersed in the copper-nickel base matrix along with the chromium boride and/or chromium silicide particles.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

Figure 1:
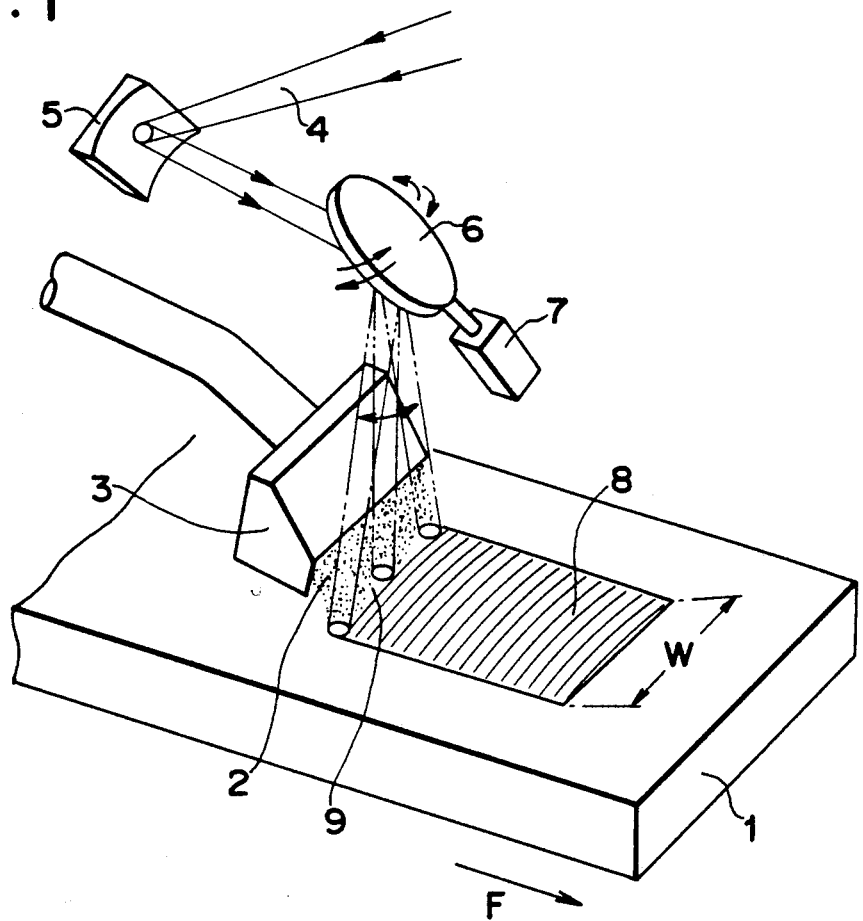
FIG. 1 is a perspective view illustrating how to fusion weld the dispersion-strengthened copper base alloy of the present invention onto a metallic substrate using a laser beam.

The copper base alloy according to the first aspect of the present invention consists essentially of, in percent by weight, 10–40% of Ni, 1–7% of Si, 0.5–5% of B, and 1–20% of Cr, the balance being Cu. The alloy has a structure in which particles of a chromium compound such as chromium boride and chromium silicide having a size of about 0.1 to about 50 $\mu$m are evenly dispersed in the copper-nickel base matrix. The chromium boride and chromium silicide particles are hard enough to provide a dispersion strengthening effect so that the resulting alloy exhibits high wear resistance. The matrix is basically a Cu-Ni alloy in which copper forms a solid solution with nickel. Since the Cu-Ni alloy has outstandingly higher strength and heat resistance than pure copper, the matrix is seldom softened even at elevated temperatures. This contributes to the wear resistance of the alloy at elevated temperatures together with the fact that the dispersed hard particles of chromium boride and silicide themselves are stable at elevated temperatures.

The copper base alloy according to the second aspect of the present invention has more improved heat resistance and toughness because the copper-nickel base matrix is further reinforced by the presence of at least one of W, Mo, and Fe.

The copper base alloy according to the third aspect of the present invention has more improved wear resistance and heat resistance because a high-melting carbide having a substantially high hardness is additionally contained so that high-melting carbide particles are uniformly dispersed in the matrix of Cu-Ni alloy in addition to the chromium boride and silicide.

The copper base alloy according to the fourth aspect of the present invention which contains at least one of W, Mo, and Fe as well as a high-melting carbide has more improved wear resistance, heat resistance, and toughness because the effect of the addition of at least one of W, Mo, and Fe according to the second aspect is combined with the effect of the addition of a high-melting carbide according to the third aspect.

The reasons of limiting the identity and proportion of elements in the alloy of the present invention will be described below. All percents are by weight unless otherwise stated.

Ni 10–40%

Nickel is an element a large amount of which can form a solid solution with copper. Nickel converts the matrix phase enclosing the hard dispersion phase into a harder Cu-Ni alloy phase and increases the wear resistance at elevated temperatures. Part of nickel forms the silicide and boride of nickel or nickel-iron also contributing to strengthening of the matrix. The nickel content is limited to the range of from 10 to 40% in order to achieve the object of improving the wear resistance of a metallic substrate by fusion welding a copper base alloy to a selected portion thereof. Less than 10% of Ni is insufficient to strengthen the matrix and will often result in a heterogeneous structure. More than 40% of Ni adversely affects the fusibility of a copper base alloy to a metallic substrate, especially to an aluminum alloy substrate, often failing to achieve the object. In the disclosure, the term "fusibility" is used in a broad sense in conjunction with the deposition of a copper base alloy to a metallic substrate by fusion welding or cladding to encompass the weldability of the alloy to the substrate, the wettability at the interface between the alloy and the substrate, the presence or absence of crack and separation at the interface, and weld bead crack.

Si 1–7%

Silicon is an element necessary to form chromium silicide which is dispersed as hard particles playing the role of strengthening the copper base matrix. Part of silicon also contributes to the formation of nickel silicide or iron-nickel silicide. Silicon also functions to improve fusibility by increasing the self melting of the associated alloy. The silicon content is limited to the range of from 1 to 7%. Less than 1% of Si forms insufficient chromium silicide particles to provide the desired hard dispersion phase. Cracks often occur in a copper base alloy containing more than 7% of Si when it is deposited on a metallic substrate.

B 0.5–5%

Boron is an element necessary to form chromium boride which is dispersed as hard particles playing the role of strengthening the copper base matrix. Boron also functions to improve fusibility by increasing the self melting of the associated alloy. The boron content is limited to the range of from 0.5 to 5%. Less than 0.5% of B is insufficient to improve fusibility. Cracks often occur in a copper base alloy containing more than 5% of B when it is deposited on a metallic substrate.

Cr 1-20%

Chromium is an element necessary to form chromium silicide and/or boride which is dispersed as hard particles playing the role of strengthening the copper base matrix. The chromium content is limited to the range of from 1 to 20%. Less than 1% of Cr is insufficient to form a homogeneous dispersion phase. More than 20% of Cr adversely affect fusibility.

Fe 1-20%, W 0.1-5%, Mo 0.1-5%

These elements are selectively added to the alloys according to the second and fourth aspects of the present invention. They function to strengthen the matrix phase to further improve heat resistance and wear resistance as well as preventing cracks upon fusion welding. Their effect is not available below the lower limits. Their contents beyond the upper limits adversely affect the fusibility to a metallic substrate, particularly to an aluminum substrate.

High-melting point carbide 1-20%

A high-melting point carbide is added to the alloys according to the third and fourth aspects of the present invention. It functions to improve wear resistance when dispersed in the copper-nickel base matrix. The high-melting point carbides used herein include carbides which have a melting point of at least 1,500° C. and do not substantially react with the remaining ingredients of the alloy (neither form a solid solution nor precipitate). Examples of the high-melting carbide include WC, TaC, TiC, $Cr_3C_2$, VC, and NbC. The content of high-melting point carbide is limited to the range of from 1 to 20%. Less than 1% of the high-melting carbide is insufficient to improve wear resistance whereas more than 20% of the high-melting carbide adversely affects fusibility.

The remainder of the present alloy is copper. The presence of incidental impurities is contemplated herein.

The copper base alloy of the present invention has a structure in which chromium silicide and/or boride is evenly dispersed as hard dispersion phase particles in the Cu-Ni base alloy matrix. The particles of chromium silicide and/or boride have a particle size of from about 0.1 to about 50 $\mu$m, preferably from about 0.1 to about 20 $\mu$m, and more preferably from about 0.1 to about 10 $\mu$m. Particles of less than about 0.1 $\mu$m in size are too small to provide wear resistance, particularly sliding wear resistance although they can enhance hardness. A size of more than about 50 $\mu$m is too large as dispersed particles to form a homogeneous structure, failing to provide satisfactory wear resistance.

The copper base alloys according to the third and fourth aspects of the present invention have a structure in which particles of the high-melting point carbide are dispersed in the matrix as well as the chromium silicide and/or boride particles. The high-melting carbide particles preferably have a size of from several microns to about 100 $\mu$m, more preferably from about 5 to about 30 $\mu$m. When the alloy is deposited from a melt thereof on a metallic substrate, the high-melting carbide usually disperses and solidifies in the alloy without reacting with the matrix phase. For this reason, it is preferred to use the high-melting carbide particles with a size of from several microns to about 100 $\mu$m in an alloy composition even prior to deposition.

The copper base alloy of the present invention may be readily prepared by depositing a corresponding composition on any desired metallic substrate using a high density heat energy such as given by a laser beam, TIG arc, electron beam, and plasma arc. More particularly, the present alloy is deposited on a selected portion of a metallic substrate, particularly an aluminum substrate where it is desired to increase wear resistance by previously placing an alloy or metal mixture in powder form having the same composition as the present alloy on the selected portion. It is also possible to continuously supply the powder by increments as the process proceeds. A high density heat energy such as a laser beam is applied to the powder to rapidly melt the powder. By scanning the high density heat energy, that is, moving the point of application of high density heat energy or stopping the application, heat is removed from the spot where the powder has been melted. Then the melt will rapidly quench and solidify to form a deposit on the substrate.

In the preferred embodiment wherein the high-melting carbide is added, it is a usual practice to mix the powder high-melting point carbide with the powder alloy or metal mixture of the remaining ingredients and supply the resulting mixture to the welding site of a substrate.

One embodiment wherein a copper base alloy of the present invention is deposited on a metallic substrate by laser welding is illustrated by referring to FIG. 1.

In FIG. 1, a metallic substrate 1 is continuously moved to the right or in a direction of arrow F at a speed of about 450 to 2,000 mm/min. A powder alloy or metal mixture from which a fused layer of the desired copper base alloy is eventually formed is contained in a hopper (not shown). The powder is continuously supplied onto the substrate 1 through a distributor 3 over a distance W in a direction transverse to the feed direction F. A laser beam 4 is emitted from a laser source (not shown), turned by a mirror 5, reflected by an oscillating mirror 6, and focused to a spot of about 0.5 to 5.0 mm in diameter on the powder deposit 2 on the substrate. The powder is generally exposed to the laser beam at a power density of about $1 \times 10^2$ to about $2 \times 10^4$ W/mm$^2$. The mirror 6 is oscillated over a predetermined angle range by oscillating means in the form of a galvanomotor 7. Therefore, the laser beam 4 to be applied to the powder 2 on the substrate 1 is oscillated or reciprocated at a frequency of about 10 to 500 Hz in a direction perpendicular to the feed direction F of the substrate 1, that is, in the direction of width W of the powder 2 on the substrate.

By exposing the powder 2 on the substrate 1 to the laser beam 4 in the oscillating/scanning mode as described above, a strip of the powder 2 is rapidly fused into a strip melt 9 which is fully agitated by oscillation of the laser beam 4. As the strip melt 9 is moved away from the laser beam oscillating zone with the advance of the substrate 1 in direction F, the melt 9 rapidly quenches due to heat transfer to the substrate side, forming a fused layer 8 of the copper base alloy.

The point of feed of powder 2 is correlated to the point of application of laser beam 4 such that the powder 2 directly falls in an oscillating zone of application of laser beam 4 as shown in FIG. 1.

EXAMPLES

Examples of the present invention are given below by way of illustration and not by way of limitation. In the examples, W is watt and J is Joule.

Example 1

A powder alloy having a composition of Cu-20% Ni-3% Si-1.5% B and another powder alloy having a composition of Ni- 15% Cr-2% W-15% Fe-2% Si-1%B were thoroughly mixed to form a mixture containing 20% of the latter. The mixture was melt deposited onto a metallic substrate of aluminum alloy according to JIS AC2C by applying a laser beam as a heat source. The arrangement used to carry out fusion welding was as shown in FIG. 1. The fusion welding conditions were: laser output 3.8 kW, laser beam spot diameter 2.5 mm, power density of laser applied about 1,200 W/mm$^2$, energy density 48 J/mm$^2$, laser beam oscillating stroke 6 mm, oscillating frequency 300 Hz, scanning speed (substrate feed speed) 750 mm/min., and powder particle size 80–280 mesh.

Figure 2:
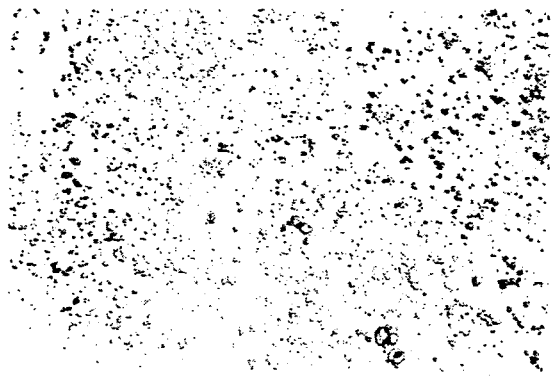
FIG. 2 is a photomicrograph (magnification X200) showing the structure in cross section of a wear resisting copper base alloy layer formed in Example 1.

The fused layer was a wear resisting copper base alloy within the scope of the present invention. The microstructure of the layer is shown in the photomicrograph of FIG. 2. It is seen that the alloy layer has a structure in which fine particles of chromium silicide and boride having a size of about 0.1 to 20 $\mu$m are evenly dispersed in the matrix of Cu-Ni base alloy. An analysis of the entire alloy layer showed a composition of Cu-29% Ni-2.8% Si-1.4% B-3% Cr-0.4% W-3% Fe.

Example 2

A powder alloy having a composition of Cu-20% Ni-3% Si-1.5% B and another powder alloy having a composition of Ni-40% Cr-1% W-5% Mo-4% Si-1.5% B were thoroughly mixed to form a mixture containing 30% of the latter. The mixture was melt deposited onto a metallic substrate of aluminum alloy by applying a laser beam as a heat source as in Example 1. The fusion welding conditions were: laser output 4.2 kW, laser beam spot diameter 3.0 mm, power density of laser applied 600 W/mm$^2$, energy density 60 J/mm$^2$, oscillating frequency 200 Hz, scanning speed (substrate feed speed) 800 mm/min., and powder particle size 80–280 mesh.

Figure 3:
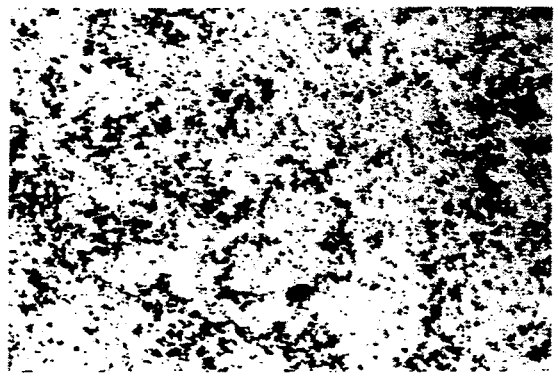
FIG. 3 is a photomicrograph (magnification X200) showing the structure in cross section of a wear resisting copper base alloy layer formed in Example 2.

The fused layer was a wear resisting copper base alloy within the scope of the present invention. The microstructure of the layer is shown in the photomicrograph of FIG. 3. It is seen that the alloy layer has a structure in which fine particles of chromium silicide and boride having a size of about 0.1 to 20 $\mu$m are evenly dispersed in the matrix of Cu-Ni base alloy. An analysis of the entire alloy layer showed a composition of Cu-28.5% Ni-3.3% Si-1.5% B-12% Cr-0.3% W-1.5% Mo.

Example 3

A mixture was prepared by thoroughly mixing a powder alloy having a composition of Cu-30% Ni-3% Si-3% B-10% Cr-4% Fe-0.4% W-0.2% Mo and a particle size of 80 to 280 mesh with 10% of the mixture of powder tungsten carbide WC having a particle size of −350 mesh. The mixture was melt deposited onto a metallic substrate of aluminum alloy by applying a laser beam as a heat source as in Example 1. The fusion welding conditions were the same as in Example 1.

Figure 4:
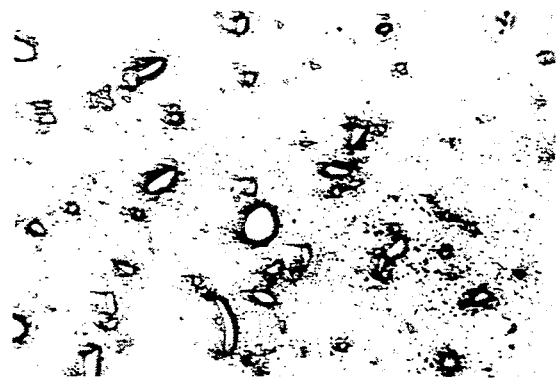
FIG. 4 is a photomicrograph (magnification X200) showing the structure in cross section of a wear resisting copper base alloy layer formed in Example 3.

The fused layer was a wear resisting copper base alloy within the scope of the present invention. The microstructure of the layer is shown in the photomicrograph of FIG. 4. It is seen that the alloy layer has a structure in which fine particles of chromium silicide and boride having a size of about 0.1 to 20 $\mu$m and fine particles of tungsten carbide WC having a size of about 5 to 30 $\mu$m are substantially evenly dispersed in the matrix of Cu-Ni base alloy. It was observed that tungsten carbide WC solidified and dispersed substantially evenly in the same state as agitated by the oscillating laser beam without substantially reacting with the matrix. An analysis of the entire alloy layer showed a composition of Cu-27% Ni-2.7% Si-2.7% B-9% Cr-3.6% Fe-0.36% W (which did not form WC) -0.18% Mo-10% WC.

Example 4

A powder mixture was prepared by mixing a powder alloy having a composition of Cu-15% Ni-3% Si-1.5% B and a particle size of 80 to 280 mesh and another powder alloy having a composition of Ni-30% Cr-5% Fe-2% Si-3% B and a particle size of 80 to 280 mesh such that the mixture contained 20% of the latter, then adding 5% of tantalum carbide TaC, and thoroughly mixing them. The mixture was melt deposited onto a metallic substrate of aluminum alloy by applying a laser beam as a heat source as in Example 1. The fusion welding conditions were the same as in Example 1.

Figure 5:
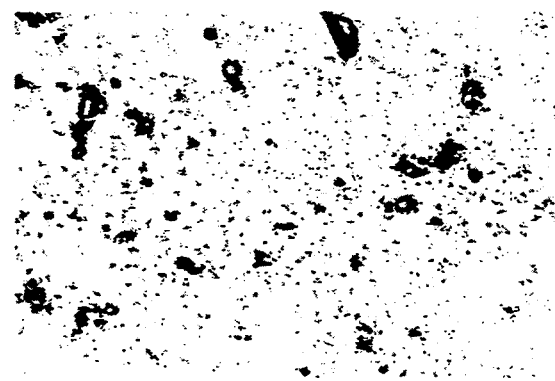
FIG. 5 is a photomicrograph (magnification X200) showing the structure in cross section of a wear resisting copper base alloy layer formed in Example 4.

The fused layer was a wear resisting copper base alloy within the scope of the present invention. The microstructure of the layer is shown in the photomicrograph of FIG. 5. It is seen that the alloy layer has a structure in which fine particles of chromium silicide and boride having a size of about 0.1 to 20 $\mu$m and fine particles of tantalum carbide TaC having a size of about 3 to 30 $\mu$m are substantially evenly dispersed in the matrix of Cu-Ni base alloy. It was again observed that tantalum carbide TaC dispersed evenly without substantially reacting with the matrix. An analysis of the entire alloy layer showed a composition of Cu-23.2% Ni-2.65% Si-1.73% B-6% Cr-1% Fe-5% TaC.

Figure 6:
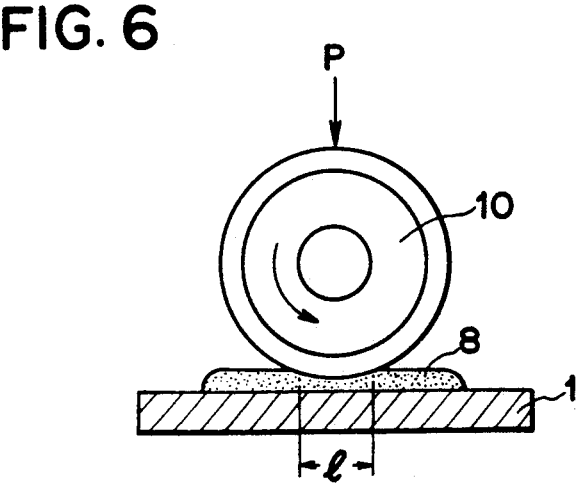
FIG. 6 is a schematic view illustrating an abrasion test of Ogoshi type.

The copper base alloys obtained in Examples 1 through 4 were determined for sliding wear resistance by carrying out an abrasion test using an abrasion tester of Ogoshi type at room temperature and 400° C. The tester included a rotor 10 set in contact with a dispersion-strengthened alloy layer 8 on a substrate 1 as shown in FIG. 6. The test was carried out by rotating the rotor 10 in the arrowed direction while applying a load to the rotor 10 toward the alloy layer 8 in a direction perpendicular to its major surface as shown by arrow P, and measuring the spread l of an abraded area. The abrading conditions were: sliding speed 0.3 m/sec., sliding distance 100 m, and final load 10 kg. The abrading rotor 10 was a quench hardened tool steel SKD11 in the room temperature test and Stellite No. 1 alloy in the 400° C. test. In the 400° C. test, the test piece was maintained for 20 minutes in the test atmosphere so that the entire piece was heated to the ambient temperature before the test was started.

Figure 7:
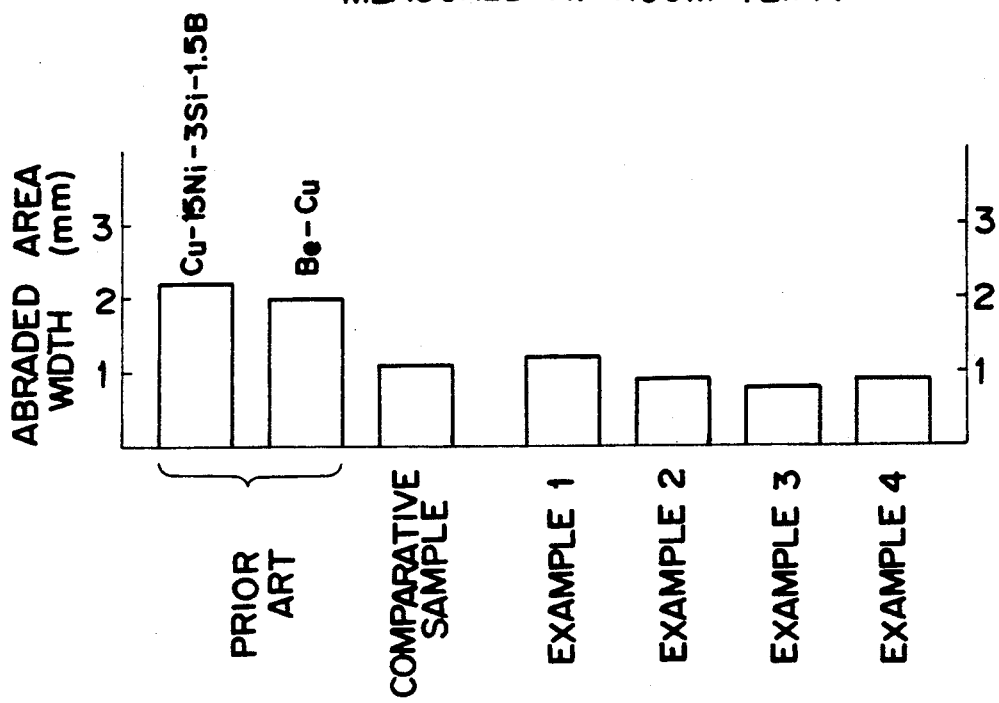
FIG. 7 is a diagram showing the results of an abrasion test at room temperature.
Figure 8:
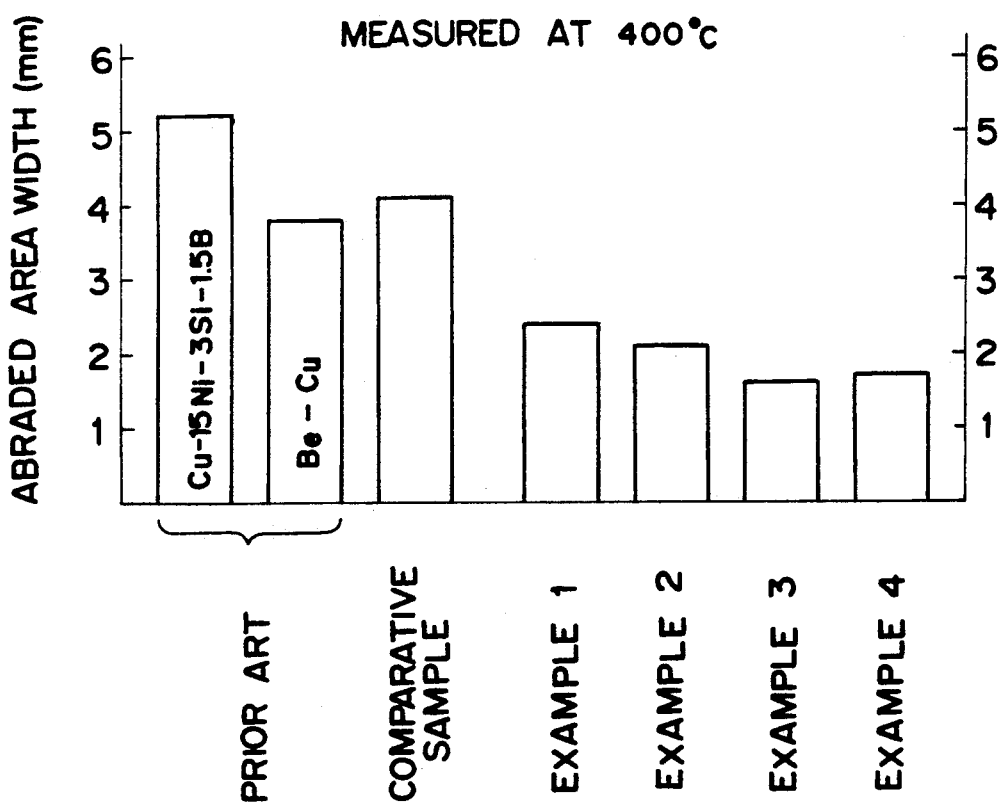
FIG. 8 is a diagram showing the results of an abrasion test at 400° C.

The results of the abrasion test are shown in FIGS. 7 and 8 together with the test results of conventional wear resisting alloy materials, Cu-15% Ni-3% Si-1.5% B alloy and beryllium-copper alloy (both prepared by conventional procedures known for their manufacture), and a comparative sample which was a buildup layer of copper base alloy as claimed in Japanese Patent Application No. 61-303176 (U.S. Ser. No. 133,620). The comparative sample or copper base alloy buildup layer according to Japanese Patent Application No. 61-303176 (U.S. Ser. No. 133,620) was formed by fusion welding an alloy powder having a composition of Cu-15% Ni-3.0% Si-1.5% B-5% Fe-0.7% Ti on an aluminum alloy substrate using laser light as a heat source under conditions: laser output 3.2 kW, laser beam spot diameter 3.0 mm, power density of laser applied 450 W/mm$^2$, laser beam oscillating stroke 6 mm, oscillating frequency 200 Hz, scanning speed (substrate feed speed) 750 mm/min., and powder particle size $-100$ to $+280$ mesh.

As seen from FIGS. 7 and 8, all the copper base alloys of Examples 1-4 of the invention had superior abrasion resistance under sliding friction, particularly at the elevated temperature of 400° C. to the conventional alloys and even to the comparative sample. Especially, the copper base alloys of Examples 3 and 4 having carbide added thereto exhibited excellent abrasion resistance at the elevated temperature.

Since the dispersion-strengthened copper base alloy of the present invention has improved wear resistance particularly at elevated temperatures and is thus suitable for the manufacture of wear resisting members which are used at elevated temperatures. The present alloy is very useful as a heat and wear resistant material serviceable at a temperature of up to 500° C. because it has an increased strength at such elevated temperatures and a high heat conductivity because of copper base. The present alloy may be deposited on any desired metallic substrates including aluminum, iron and copper base alloys by fusion welding. Then a fused layer of the present alloy may be formed only on a selected portion of any desired machinery members including both large and small sized members where wear resistance is required, imparting the necessary wear resistance to the selected portion only without detracting from other properties of the entire member.

Obviously many modifications and variations of the present invention are possible in the light of the above teachings. It is therefore to be understood that within the scope of the appended claims the invention may be practiced otherwise than as specifically described.

We claim:

1. A composite article comprising a dispersion-strengthened, copper-base alloy having improved heat resistance and wear resistance and a metallic substrate onto which said alloy is deposited, said alloy consisting essentially of, in weight percent;
   10 to 40% nickel,
   1 to 7% silicon,
   0.5 to 5% boron,
   1 to 20% chromium, and
   balance copper,
with said deposited alloy having prealloyed particles of at least one of chromium boride and chromium silicide having a particle size of about 0.1 to 50 microns evenly dispersed in a copper-nickel base matrix of said deposited alloy, said alloy being deposited in the form of powder on said metallic substrate and then applying to said alloy powder high density heat energy to rapidly form a melt of said alloy powder and fuse said melt to said metallic substrate and thereafter rapidly quenching said melt to solidify said alloy thereof and form a solidified deposit of said alloy on said metallic substrate and crystallize said particles.

2. The composite article of claim 1 wherein said copper-base alloy further includes at least one metal selected from the group consisting of 0.1 to 5% tungsten, 0.1 to 5% molybdenum, and 1 to 20% iron.

3. The composite article of claim 1 wherein said copper-base alloy further includes 1 to 20% of a high melting temperature carbide evenly dispersed in said copper-nickel base matrix.

4. The composite article of claim 1 wherein said copper-base alloy further includes at least one metal selected from the group consisting of 0.1 to 5% tungsten, 0.1 to 5% molybdenum, and 1 to 20% iron, and 1 to 20% of a high melting temperature carbide evenly dispersed in said copper-nickel base matrix.

* * * * *